UNITED STATES PATENT OFFICE.

EDWARD J. YETTER, OF DENVER, COLORADO.

COMPOSITION FOR ROOFING, PAVING, &c.

No. 820,163.      Specification of Letters Patent.      Patented May 8, 1906.

Application filed April 12, 1904. Serial No. 202,764.

*To all whom it may concern:*

Be it known that I, EDWARD J. YETTER, a citizen of the United States, residing at Denver, in the county of Denver and State of Colorado, have invented certain new and useful Improvements in Compositions for Roofing, Paving, &c.; and I do hereby declare the following to be a full, clear, and exact description of the invention, such as will enable others skilled in the art to which it appertains to make and use the same.

My composition, which is particularly adapted for use in preparing roofing-sheets, sheathing, paving, &c., consists of the ingredients elaterite or wurtzilite, gilsonite, and lime sludge, with a suitable oil or flux, if necessary, and with or without the addition of asphaltum or equivalent substance, all combined in suitable proportions.

The elaterite or wurtzilite of this composition is a soluble and fusible conversion of the crude mineral. Such a soluble and fusible product is described in United States Letters Patent to Chas. E. Anthony, No. 620,082, dated February 21, 1899. This product, as pointed out in the specification of said patent, retains all the valuable characteristics of the crude material from which it is produced, but, unlike the crude intractible wurtzilite, is soluble in the ordinary solvents of caoutchouc and bitumen and is fusible under ordinary heating methods. In form, elasticity, hardness, color, and electric character the product corresponds closely with the crude mineral; but while the latter is ignitible and decomposes before reaching the fusion-point the product does not take fire, but when a flame is applied thereto simply melts. According to the Anthony process the product is obtained substantially as follows: A quantity of crude wurtzilite is placed in an air-tight vessel or retort and heated to about 600° Fahrenheit, with the effect, in perhaps an hour's time, of evolving a light gas, which in turn attacks the wurtzilite, first reducing it to a spongy mass and after several hours to a liquid state, in which it may be drawn off for use. The product which is drawn off from the retort may be immediately used in its hot liquid condition, or partially cooled or solidified and worked in some suitable apparatus, or completely cooled and hardened. I do not confine myself, however, to the use of this particular product obtained by the Anthony process should an elaterite of proper characteristics be produced by other methods.

Gilsonite, or "uintahite," as it is also called, is a comparatively recent hydrocarbon, a bituminous material, which has been discussed in various publications. (See United States Patent to S. H. Gilson, No. 361,759, April 26, 1887; United States Patent to E. J. Yetter, No. 633,255, September 19, 1899, and Locke's article in *Transactions of American Institute of Mining Engineers*, Vol. 16, page 162.) As well known, gilsonite possesses valuable properties as the principal ingredients in roofing compositions; but used alone it is unsatisfactory, being too brittle and not adapted as a base which can be tempered to proper consistency, wherefore it is frequently combined with other substances, such as asphaltums and oils.

Lime sludge is a substance found usually as a refuse product of sugar factories, obtained in large quantities in the refining of beet-sugar. It is a calcined limestone which has taken up carbonic acid in the purifying process and is practically a carbonate of lime, which, however, has special physical characteristics particularly adapting it for this composition. This waste product, known as "lime sludge" and sometimes pressed into "lime cakes" and called "lime mud," has no commercial value at the refineries and is therefore not saved by them, but is, on the contrary, a source of annoyance and expense to get rid of. It is thus a very inexpensive ingredient. It has a peculiarly strong affinity for hydrocarbons and readily combines chemically therewith when thoroughly pulverized and mixed. Lime sludge has this special affinity for both elaterite and gilsonite and when combined therewith in large proportions produces an inexpensive but commercially valuable composition having many desirable qualities, as toughness, tenacity, pliability, and resistance to disintegration. The composition thus produced possesses the chief characteristics of both gilsonite and elaterite, the condition of which is changed, however, by the presence of the lime sludge, becoming tougher and resistant to the ordinary causes of wear and deterioration. The lime sludge possesses great mechanical and chemical advantages for uniting with the other ingredients and, in addition, contains a percentage of foreign or vegetable matter, which is a further advantage.

In forming this composition I first heat the elaterite and gilsonite to liquid condition, usually separately, and thoroughly commingle the hot liquid ingredients, to which I introduce the lime sludge in thoroughly-pulverized form. A suitable oil, as maltha, residuum of petroleum-oil, crude petroleum, some of the non-drying vegetable oils, cotton-seed oil or linseed-oil, or any equivalent, is also added, if necessary, as a flux. Various proportions of these ingredients may be adopted in accordance with the purpose in view. Asphaltum is also found highly valuable in combination with these ingredients, either with or without the oil, according to the nature of the asphaltum. Thus where hard asphaltum is used, such as the Trinidad variety, it is desirable to add an oil flux; but in using a soft asphaltum—such as the California, Texas, or other manufactured varieties, which naturally contain oil or have it incorporated in sufficient proportion by the refining process—oil as a distinct ingredient is not necessary. Any equivalent of asphaltum or substance of like nature may also be combined with the other ingredients named.

For roofing and sheathing a suitable oil or flux is considered an essential ingredient unless asphaltum or equivalent material is used so tempered with oil that this substance may be omitted as a distinct ingredient.

To any of the compositions referred to having gilsonite and lime sludge as the chief ingredients I may also add sand, litharge, infusorial earth, gravel, and other substances useful for roofing and paving compositions.

In addition to the composition described, I also desire to cover *per se* the combination of gilsonite and elaterite either alone, with oil, asphaltum, lime, chalk, earths, clays, and the like, since these two ingredients in combination are new and valuable, so far as I am aware.

I have found the following admixtures give excellent results: First, elaterite or wurtzilite, one hundred pounds; gilsonite, fifty pounds. Second, elaterite, one hundred pounds; gilsonite, fifty pounds; lime-sludge, one hundred pounds. Third, elaterite, one hundred pounds; gilsonite, one hundred pounds; oil, one hundred and fifty pounds; lime sludge, one hundred pounds. Fourth, elaterite, fifty pounds; gilsonite, one hundred pounds; asphaltum, one hundred pounds; oil, one hundred and seventy-five pounds; lime sludge, one hundred pounds. The first and second of these compositions are hard preparations designed for roofing and paving-blocks, &c. The third and fourth admixtures are more especially adapted for roofing compositions and coatings and may be applied in liquid form for saturating and coating burlap, muslin, paper, and other fabrics for making roofing-sheets, floor-coverings, linings, and similar articles. They may also be tempered by heat or by slight changes in the combinations or in the use of different kinds of asphaltums or gilsonites.

The proportions of the ingredients may be varied as found desirable, either on account of the particular raw materials used, which differ, more or less in their natures, or on account of the particular purpose in view or desired effect and temper. I do not limit myself to any specific proportions.

The term "elaterite" as used in the following claims is intended to cover a material substantially as described herein, whether produced by a conversion of crude wurtzilite or by other methods, and includes any equivalent material or product known under the names of "elaterite" or "wurtzilite."

I claim as my invention and desire to secure by Letters Patent of the United States—

1. A roofing or paving composition containing elaterite, gilsonite and lime sludge combined in suitable proportions.

2. A roofing or paving composition containing elaterite, gilsonite and lime sludge combined in suitable proportions, together with a suitable oil or flux.

3. A roofing composition containing elaterite, gilsonite, carbonate of lime, and asphaltum, with a suitable oil or flux either incorporated in the asphaltum or as a separate ingredient.

In testimony whereof I affix my signature in presence of two witnesses.

EDWARD J. YETTER.

Witnesses:
MARY McCRUDDEN,
FRANK C. ERVIN.